(12) United States Patent
Lee et al.

(10) Patent No.: US 10,256,888 B2
(45) Date of Patent: Apr. 9, 2019

(54) FEEDBACK METHOD AND APPARATUS FOR USE IN MOBILE COMMUNICATION SYSTEM

(71) Applicant: Samsung Electronics Co., Ltd., Gyeonggi-do (KR)

(72) Inventors: Hyojin Lee, Gyeonggi-do (KR); Younsun Kim, Gyeonggi-do (KR); Yongjun Kwak, Gyeonggi-do (KR); Juho Lee, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 14/032,533

(22) Filed: Sep. 20, 2013

(65) Prior Publication Data

US 2014/0079149 A1 Mar. 20, 2014

(30) Foreign Application Priority Data

Sep. 20, 2012 (KR) .......................... 10-2012-0104434

(51) Int. Cl.
*H04B 7/06* (2006.01)
*H04L 5/00* (2006.01)
*H04B 7/0417* (2017.01)

(52) U.S. Cl.
CPC ......... *H04B 7/0632* (2013.01); *H04B 7/0417* (2013.01); *H04B 7/065* (2013.01);
(Continued)

(58) Field of Classification Search
CPC .......... H04B 7/02; H04B 7/04; H04B 7/0404; H04B 7/0408; H04B 7/0413;
(Continued)

(56) References Cited

U.S. PATENT DOCUMENTS

| 2011/0164668 A1* | 7/2011 | Hoek | H04B 7/0619 |
| | | | 375/224 |
| 2011/0237270 A1* | 9/2011 | Noh | H04B 7/0413 |
| | | | 455/450 |

(Continued)

FOREIGN PATENT DOCUMENTS

| AU | 2011-227860 | 3/2011 |
| JP | 2011-234265 | 11/2011 |

(Continued)

OTHER PUBLICATIONS

Samsung, "CSI Feedback Mechanism for Multiple Transmission Points", R1-114224, 3GPP TSG RAN WG1 #67, Nov. 14-18, 2011.

(Continued)

*Primary Examiner* — Young T Tse
(74) *Attorney, Agent, or Firm* — The Farrell Law Firm, P.C.

(57) ABSTRACT

A method and system are provided for a terminal to measure channel quality and transmit channel state information to a base station in a wireless mobile communication system operating in a multi-carrier-based multiple access scheme such as Orthogonal Frequency Division Multiple Access (OFDMA). The feedback information transmission method of a terminal in a mobile communication system includes receiving configuration information corresponding to at least two reference signals from a base station, receiving, at the terminal, feedback configuration information for measuring the at least two reference signals and generating feedback information based on a measurement result, receiving, at the terminal, the at least two reference signals, and transmitting, by the terminal, the feedback information at timings indicated in the feedback configuration information.

12 Claims, 16 Drawing Sheets

(52) U.S. Cl.
CPC .......... *H04L 5/0048* (2013.01); *H04B 7/0639* (2013.01); *H04L 5/0053* (2013.01); *H04L 5/0057* (2013.01)

(58) Field of Classification Search
CPC .. H04B 7/0417; H04B 7/0452; H04B 7/0456; H04B 7/0619; H04B 7/0626; H04B 7/0632; H04B 7/0639; H04B 7/065; H04L 5/0048; H04L 5/005; H04L 5/0051; H04L 5/0057
USPC ....... 375/224, 225, 227, 259, 260, 262, 265, 375/267, 340, 341; 445/424, 425, 517, 445/524, 67.13, 69
See application file for complete search history.

(56) References Cited

U.S. PATENT DOCUMENTS

| | | | |
|---|---|---|---|
| 2011/0292874 A1 | 12/2011 | Ho et al. | |
| 2012/0009959 A1* | 1/2012 | Yamada | H04B 7/0413 455/507 |
| 2012/0058791 A1* | 3/2012 | Bhattad | H04L 1/0606 455/509 |
| 2012/0076024 A1 | 3/2012 | Ko et al. | |
| 2012/0076028 A1* | 3/2012 | Ko | H04L 1/0026 370/252 |
| 2012/0088458 A1* | 4/2012 | Nogami | H04B 7/0632 455/67.11 |
| 2012/0088514 A1* | 4/2012 | Lee | H04B 7/0434 455/450 |
| 2012/0106501 A1* | 5/2012 | Kishiyama | H04L 1/0026 370/330 |
| 2012/0147766 A1 | 6/2012 | Kim et al. | |
| 2012/0172079 A1 | 7/2012 | Baldemair et al. | |
| 2012/0176967 A1 | 7/2012 | Kim et al. | |
| 2012/0287875 A1 | 11/2012 | Kim et al. | |
| 2012/0314590 A1* | 12/2012 | Choudhury | H04B 7/0452 370/252 |
| 2013/0114425 A1* | 5/2013 | Sayana | H04B 7/024 370/252 |
| 2013/0182789 A1* | 7/2013 | Ko | H04L 1/0026 375/267 |
| 2013/0195035 A1* | 8/2013 | Taoka | H04B 7/0478 370/329 |
| 2013/0279343 A1 | 10/2013 | Jeong et al. | |
| 2013/0303230 A1* | 11/2013 | Sayana | H04W 24/08 455/524 |
| 2013/0322361 A1 | 12/2013 | Ko et al. | |
| 2014/0177745 A1* | 6/2014 | Krishnamurthy | H04B 7/0413 375/267 |
| 2015/0155992 A1 | 6/2015 | Kim et al. | |

FOREIGN PATENT DOCUMENTS

| | | |
|---|---|---|
| JP | 2012-080584 | 4/2012 |
| JP | 2013-533673 | 8/2013 |
| JP | 2014-506059 | 3/2014 |
| KR | 1020120029338 | 3/2012 |
| KR | 1020120047759 | 5/2012 |
| KR | 1020120063586 | 6/2012 |
| KR | 1020120081549 | 7/2012 |
| WO | WO 2011/115421 | 9/2011 |
| WO | WO 2012/036503 | 3/2012 |
| WO | WO 2012/105793 | 8/2012 |

OTHER PUBLICATIONS

Panasonic, "CoMP Measurement Set Management", R1-120226, 3GPP TSG RAN WG1 Meeting #68, Feb. 6-10, 2012.
Alcatel-Lucent Shanghai Bell, "Considerations on CSI Feedback Enhancements for High-Priority Antenna Configurations", R1-112420, 3GPP TSG-RAN WG1 #66, Aug. 22-26, 2011.
European Search Report dated Feb. 8, 2016 issued in counterpart application No. 13839136.2-1874, 10 pages.
Samsung, "CSI Feedback Mechanism for Multiple Transmission Points", R1-114224, 3GPP TSG RAN WG1 #67, Nov. 14-18th, 2011, 5 pages.
Chinese Office Action dated Mar. 29, 2017 issued in counterpart application No. 201380048882.2, 11 pages.
European Search Report dated Nov. 15, 2016 issued in counterpart application No. 13839136.2-1874, 11 pages.
Japanese Office Action dated Sep. 25, 2017 issued in counterpart application No. 2015-532966, 5 pages.
Korean Office Action dated Oct. 8, 2018 issued in counterpart application No. 10-2012-0104434, 15 pages.

* cited by examiner

FEEDBACK METHOD AND APPARATUS FOR USE IN MOBILE COMMUNICATION SYSTEM

PRIORITY

This application claims priority under 35 U.S.C. § 119(a) to Korean Application Serial No. 10-2012-0104434, which was filed in the Korean Intellectual Property Office on Sep. 20, 2012, the entire content of which is incorporated herein by reference.

BACKGROUND OF THE INVENTION

1. Field of the Invention

The present invention generally relates to a wireless mobile communication system and, more particularly, to a feedback method for a terminal to measure channel quality and transmit channel state information to a base station in a wireless mobile communication system operating in a multi-carrier-based multiple access scheme such as, for example, Orthogonal Frequency Division Multiple Access (OFDMA).

2. Description of the Related Art

Mobile communication systems have evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services.

The existing $3^{rd}$ generation mobile communication systems including LTE, Ultra Mobile Broadband (UMB), and 802.16m operate based on a multi-carrier multiple access scheme and adopt Multiple Input Multiple Output (MIMO) with channel sensitive scheduling such as beamforming and Adaptive Modulation and Coding (AMC) to improve transmission efficiency. These techniques increase the system throughput by improving transmission efficiency in such a way of concentrating transmit power of plural antennas, adjusting transmit data amount, and transmitting data selectively to the user with best channel quality based on the channel quality. Since most of these techniques operate based on the channel state information between the base station (evolved Node B (eNB)) and the terminal (User Equipment (UE) or Mobile Station (MS)), the eNB or UE has to measure the channel state between the eNB and the UE. The signal used for channel state measurement is Channel State Information Reference Signal (CSI-RS). The eNB is a transmitter in downlink and at the same time a receiver in uplink, and the one eNB may manage a plurality of cells for transmission/reception. A mobile communication system includes a plurality of eNBs distributed geographically and each eNB performs transmission/reception through the plurality of cells.

The existing $3^{rd}$ and $4^{th}$ Generation mobile communication systems represented by LTE/LTE-A adopts a MIMO scheme with a plurality of transmit and receive antennae to transmit a plurality of information streams as separated spatially. This technique of transmitting the a plurality of information streams as separated spatially is referred to as spatial multiplexing. Typically, the number of information streams capable of being spatially multiplexed depends on the number of antennas of the transmitter and the receiver. The number of information streams that can be spatially multiplexed is generally referred to as rank. In the case of the MIMO scheme, until the standard of LTE/LTE-A Release 11, the spatial multiplexing of up to 8×8 antennas and up to rank 8 are supported.

Meanwhile, the Full Dimension MIMO (FD-MIMO) system to which the technique proposed in the present invention is applied has been evolved from the LTE/LTE-A MIMO system supporting up to 8 transmission antennas so as to support 32 or more transmission antennas.

The FD-MIMO system is a wireless communication system capable of transmitting data using a few dozen or more transmission antennas.

FIG. 1 is a diagram illustrating a FD-MIMO system.

Referring to FIG. 1, the base station transmitter 100 transmits radio signals 120 and 130 through a few dozen or more transmission antennas 110. The transmission antennas 110 are arranged at a minimum distance from each other. The minimum distance may be half of a wavelength ($\lambda/2$). Typically, in a case in which the transmission antennas 110 are arranged at the distance of half of the wavelength of the radio signal, the signals transmitted by the respective transmission antennas 110 are influenced by a radio channel with low correlation. Assuming a radio signal band of 2 GH, this distance is 7.5 cm and is shortened as the band becomes higher than 2 GHz.

In FIG. 1, a few dozen or more transmission antennas 110 arranged at the base station are used to transmit signals 120, 130 to one or more terminals 140. In order to transmit signals to the plurality of terminals 140 simultaneously, an appropriated precoding is applied. At this time, one terminal may receive a plurality of information streams. Typically, a number of information streams which a terminal can receive is determined depending on the number of reception antennas of the terminal, channel state, and reception capability of the terminal.

In order to implement the FD-MIMO system efficiently, the terminal has to measure the channel condition and interference size accurately and transmit the channel state information to the base station efficiently. If the channel state information is received, the base station determines the terminals for downlink transmission, downlink data rate, and precoding to be applied. In the case of FD-MIMO system using a large number of transmission antennas, if the channel state information transmission method of the legacy LTE/LTE-A system is applied without modification, the control information amount to be transmitted in uplink increases significantly, resulting in uplink overhead.

The mobile communication system is restricted with respect to resources such as time, frequency, and transmission power. Accordingly, if the resources allocated for reference signals increase, the resource amount to be allocated for data traffic channel transmission decreases, resulting in a reduction of an absolute data transmission amount. In this case, although the channel estimation and measurement performance are improved, the data transmission amount decreases, resulting in a reduction of an entire system throughput.

Thus, there is a need for allocating the resources of reference signals and traffic channel transmissions efficiently in order to maximize the entire system throughput.

FIG. 2 is a time-frequency grid illustrating a single Resource Block (RB) of a downlink subframe as a smallest scheduling unit in the LTE/LTE-A system.

As shown in FIG. 2, the radio resource consists of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE).

The radio resource structure as shown in FIG. 2 can be used for transmitting a plurality of different types of signals as follows:

1. CRS (Cell-specific Reference Signal): reference signal transmitted to all the UEs within a cell
2. DMRS (DeModulation Reference Signal): reference signal transmitted to a specific UE
3. PDSCH (Physical Downlink Shared CHannel): data channel transmitted in downlink which the eNB uses to transmit data to the UE and is mapped to REs not used for reference signal transmission in the data region of FIG. 2
4. CSI-RS (Channel State Information Reference Signal): reference signal transmitted to the UEs within a cell and used for channel state measurement. Multiple CSI-RSs can be transmitted within a cell.
5. Other control channels (PHICH, PCFICH, PDCCH) Physical Hybrid-ARQ Indicator Channel, Physical Control Format Indicator Channel, Physical Downlink Control Channel: channels for providing control channel necessary for the UE to receive PDCCH and transmitting ACKnowledgement/Negative ACKnowledgement (ACK/NACK) of a Hybrid Automatic Repeat reQuest (HARQ) operation for uplink data transmission.

In addition to the above signals, zero power CSI-RS can be configured in order for the UEs within the corresponding cells to receive the CSI-RSs transmitted by different eNBs in the LTE-A system. The zero power CSI-RS (i.e., muting) can be mapped to the positions designated for CSI-RS, and the UE receives the traffic signal skipping the corresponding radio resource in general. In the LTE-A system, the zero power CSI-RS is referred to as muting. The zero power CSI-RS by nature is mapped to the CSI-RS position without transmission power allocation.

In FIG. 2, the CSI-RS can be transmitted at some of the positions marked by A, B, C, D, E, F, G, H, I, and J according to the number of antennas transmitting CSI-RS. Also, the zero power CSI-RS can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, an entirety of the specific pattern is used for CSI-RS transmission; and for eight antenna ports, two patterns are used for CSI-RS transmission. Meanwhile, muting is always performed by the pattern. That is, although the muting may be applied to a plurality of patterns, if the muting positions mismatch CSI-RS positions, it cannot be applied to one pattern partially.

In the case of transmitting CSI-RSs of two antenna ports, the CSI-RSs are mapped to two consecutive REs in the time domain and distinguished from each other using orthogonal codes. In the case of transmitting CSI-RSs of four antenna ports, the CSI-RSs are mapped in the same way as mapping of the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors, including downlink interference. The downlink interference includes the interference caused by the antennas of neighbor eNBs and thermal noise, which are important in determining the downlink channel condition. For example, in a case in which the eNB with one transmission antenna transmits the reference signal to the UE with one reception antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In the LTE-A system, the UE feeds back the information on the downlink channel state for use in downlink scheduling of the eNB. That is, the UE measures the reference signal transmitted by the eNB in downlink and feeds back the information estimated from the reference signal to the eNB in the format defined in LTE/LTE-A standard. In LTE/LTE-A, the UE feedback information includes the following three indicators:

1. RI (Rank Indicator): number of spatial layers that can be supported by the current channel experienced at the UE
2. PMI (Precoding Matrix Indicator): precoding matrix recommended by the current channel experienced at the UE
3. CQI (Channel Quality Indicator): maximum possible data rate that the UE can receive signal in the current channel state. CQI may be replaced with the Signal to Interference plus Noise Ratio (SINR), maximum error correction code rate and modulation scheme, or per-frequency data efficiency that can be used in a similar manner as the maximum data rate.

The RI, PMI, and CQI are associated with each other by definition. For example, the precoding matrix supported in LTE/LTE-A is configured differently per rank. Accordingly, the PMI value 'X' is interpreted differently for the cases of RI set to 1 and RI set to 2. Also, when determining CQI, the UE assumes that the PMI and RI which it has reported are applied by the eNB. That is, if the UE reports RI_X, PMI_Y, and CQI_Z; this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, the UE is configured with one of the following four feedback or reporting modes depending on the information to be included therein:

1. Mode 1-0: RI, wideband CQI (wCQI)
2. Mode 1-1: RI, wCQI, wideband PMI (wPMI)
3. Mode 2-0: RI, wCQI, subband CQI (sCQI)
4. Mode 2-1: RI, wCQI, wPMI, sCQI, sPMI The feedback timing in the respective feedback mode is determined based on $I_{CQI/PMI}$ transmitted through high layer signaling and $N_{pd}$, $N_{OFFSET,CQI}$, $M_{RI}$, $N_{OFFSET,RI}$ corresponding to $I_{RI}$. In Mode 1-0, the wCQI transmission period is $N_{pd}$, and the feedback timing is determined based on the subframe offset value of $N_{OFFSET,CQI}$. The RI transmission period is $N_{pd} \cdot M_{RI}$, and RI transmission period offset is $N_{OFFSET,CQI}+N_{OFFSET,RI}$.

FIG. 3 is a diagram illustrating feedback timings of RI and wCQI in the case of $N_{pd}=2$, $M_{RI}=2$, $N_{OFFSET,CQI}=1$, and $N_{OFFSET,RI}=1$. Here, each time is indicated by a subframe index.

Here, the feedback mode 1-1 has the same timings as the feedback mode 1-0 with the exception that PMI is transmitted at the wCQI transmission timing together.

In the feedback mode 2-0, the sCQI feedback period is $N_{pd}$ with offset $N_{OFFSET,CQI}$. The wCQI feedback period is $H \cdot N_{pd}$ with offset $N_{OFFSET,CQI}$ equal to the sCQI offset. Here, $H=J \cdot K+1$ where K is transmitted through higher layer signal and J is determined according to the system bandwidth.

For example, J is determined as 3 in the 10 MHz system. This means that wCQI is transmitted at every H sCQI transmissions instead of sCQI. The RI period $M_{RI} \cdot H \cdot N_{pd}$ with offset $N_{OFFSET,CQI}+N_{OFFSET,RI}$.

FIG. 4 is a diagram illustrating feedback timings of RI, sCQI, and wCQI in the case of $N_{pd}=2$, $M_{RI}=2$, J=3 (10 MHz), K=1, $N_{OFFSET,CQI}=1$, and $N_{OFFSET,RI}=-1$.

The feedback mode 2-1 is identical with the feedback mode 2-0 in feedback timings with the exception of the PMI being transmitted at the wCQI transmission timings together.

Unlike the feedback timings for the case of 4 CSI-RS antenna ports, as described above, two PMIs have to be transmitted for 8 CSI-RS antenna ports. For 8 CSI-RS antenna ports, the feedback mode 1-1 is divided into two sub-modes. In the first sub-mode, the first PMI is transmitted along with RI and the second PMI along with wCQI. Here, the wCQI and second PMI feedback period and offset are defined as $N_{pd}$ and $N_{OFFSET,CQI}$, and the RI and first PMI feedback period and offset are defined as $M_{RI} N_{pd}$ and $N_{OFFSET,CQI}+N_{OFFSET,RI}$, respectively. If the precoding matrix indicated by the first PMI is W1 and the precoding matrix indicated by the second PMI is W2, the UE and the eNB share the information on the UE-preferred precoding matrix of W1W2.

For the 8 CSI-RS antenna ports, the feedback mode 2-1 adopts new information of Precoding Type Indicator (PTI) which is transmitted along with RI at period of $M_{RI} \cdot H \cdot N_{pd}$ with the offset of $N_{OFFSET,CQI}+N_{OFFSET,RI}$. For PTI=0, the first and second PMIs and wCQI are transmitted, particularly the wCQI and second PMI at the same timing at a period $N_{pd}$ with an offset of $N_{OFFSET,CQI}$. Meanwhile, the first PMI is transmitted at a period of $H' \cdot N_{pd}$ with an offset of $N_{OFFSET,CQI}$. Here, H' is transmitted through higher layer signaling. For PTI=1, the PTI and RI are transmitted at the same timing, the wCQI and second PMI are transmitted at the same timing, and sCQI is also transmitted. In this case, the first PMI is not transmitted. The PTI and RI are transmitted at the same period with the same offset as the case of PTI=0, and sCQI is transmitted at a period of $N_{pd}$ with an offset of $N_{OFFSET,CQI}$. Also, the wCQI and second PMI are transmitted at a period of $H \cdot N_{pd}$ with an offset of $N_{OFFSET,CQI}$, and H is set to the same value as the case of 4 CSI-RS antenna ports.

FIGS. 5 and 6 are diagrams illustrating feedback times for PTI=0 and PTI=1 with $N_{pd}=2$, $M_{RI}=2$, J=3 (10 MHz), K=1, H'=1, and $N_{OFFSET,CQI}=1$, and $N_{OFFSET,RI}=-1$, respectively.

Typically, in the FD-MIMO using a plurality of transmission antennas, the number of CSI-RSs has to increases in proportion to the number of transmission antennas. In a case in which LTE/LTE-A uses 8 transmission antennas, the eNB has to transmit CSI-RSs of 8 ports to the UE for downlink channel state measurement. At this time, in order to transmit 8-port CSI-RSs, 8 REs has to be allocated for CSI-RS transmission in one RB as marked by A and B in FIG. 2. In the case of applying a CSI-RS transmission scheme of LTE/LTE-A to FD-MIMO, the CSI-RS transmission resource increases in proportion to the number of transmission antennas. That is, the eNB having 128 transmission antennas has to transmit CSI-RS on 128 REs in one RB. Such a CSI-RS transmission scheme consumes excessive radio resources and thus causes shortage of resource for data transmission.

SUMMARY

The present invention has been made to address at least the problems and disadvantages described above, and to provide at least the advantages described below. Accordingly, aspects of the present invention provide a method and apparatus for a UE to measure reference signals, generate channel state information, and transmit the channel state information for efficient data transmission/reception in the LTE-A system operating in the DS-MIMO mode. Also, aspects of the present invention provide a method and apparatus for an eNB to transmit the reference signals to the UE and receive the channel state information transmitted by the UE.

In accordance with an aspect of the present invention, a feedback information reception method of a base station in a mobile communication system is provided. The feedback information reception method includes transmitting configuration information corresponding to at least two reference signals to a terminal, transmitting feedback configuration information, for measuring the at least two reference signals and generating feedback information based on a measurement result, to the terminal, transmitting the at least two reference signals to the terminal, and receiving the feedback information transmitted by the terminal at timings indicated in the feedback configuration information.

In accordance with another aspect of the present invention, a base station for receiving feedback information from a terminal in a mobile communication system is provided. The base station includes a communication unit configured to transmit and receive signals to and from the terminal and a control unit configured to control transmission of configuration information corresponding to at least two reference signals to a terminal, transmission of feedback configuration information, for measuring the at least two reference signals and generating feedback information based on a measurement result, to the terminal, transmitting the at least two reference signals to the terminal, and reception of the feedback information transmitted by the terminal at a timing indicated in the feedback configuration information.

In accordance with another aspect of the present invention, a feedback information transmission method of a terminal in a mobile communication system is provided. The feedback information transmission method includes receiving configuration information corresponding to at least two reference signals from a base station, receiving feedback configuration information, for measuring the at least two reference signals and generating feedback information based on measurement result, to the terminal, receiving, by the terminal, the at least two reference signals, and transmitting, by the terminal, the feedback information at timings indicated in the feedback configuration information.

In accordance with still another aspect of the present invention, a terminal for transmitting feedback information to a base station in a mobile communication system is provided. The terminal includes a communication unit configured to transmit and receive signals to and from the base station and a control unit configured to control reception of configuration information corresponding to at least two reference signals from the base station, reception of feedback configuration information, for measuring the at least two reference signals and generating feedback information based on measurement result, by the terminal, reception of the at least two reference signals by the terminal, and transmission of the feedback information, by the terminal, at timings indicated in the feedback configuration information.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention will now be described with reference to the accompanying drawings in detail. A detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present invention.

Although the following description is directed to the OFDM-based radio communication system, particularly the 3GPP Evolved Universal Terrestrial Radio Access (E-UTRA), it will be understood by those skilled in the art that the present invention can be applied to other communication systems having a similar technical background and channel format, with slight modifications, without departing from the spirit and scope of the present invention.

Figure 1:
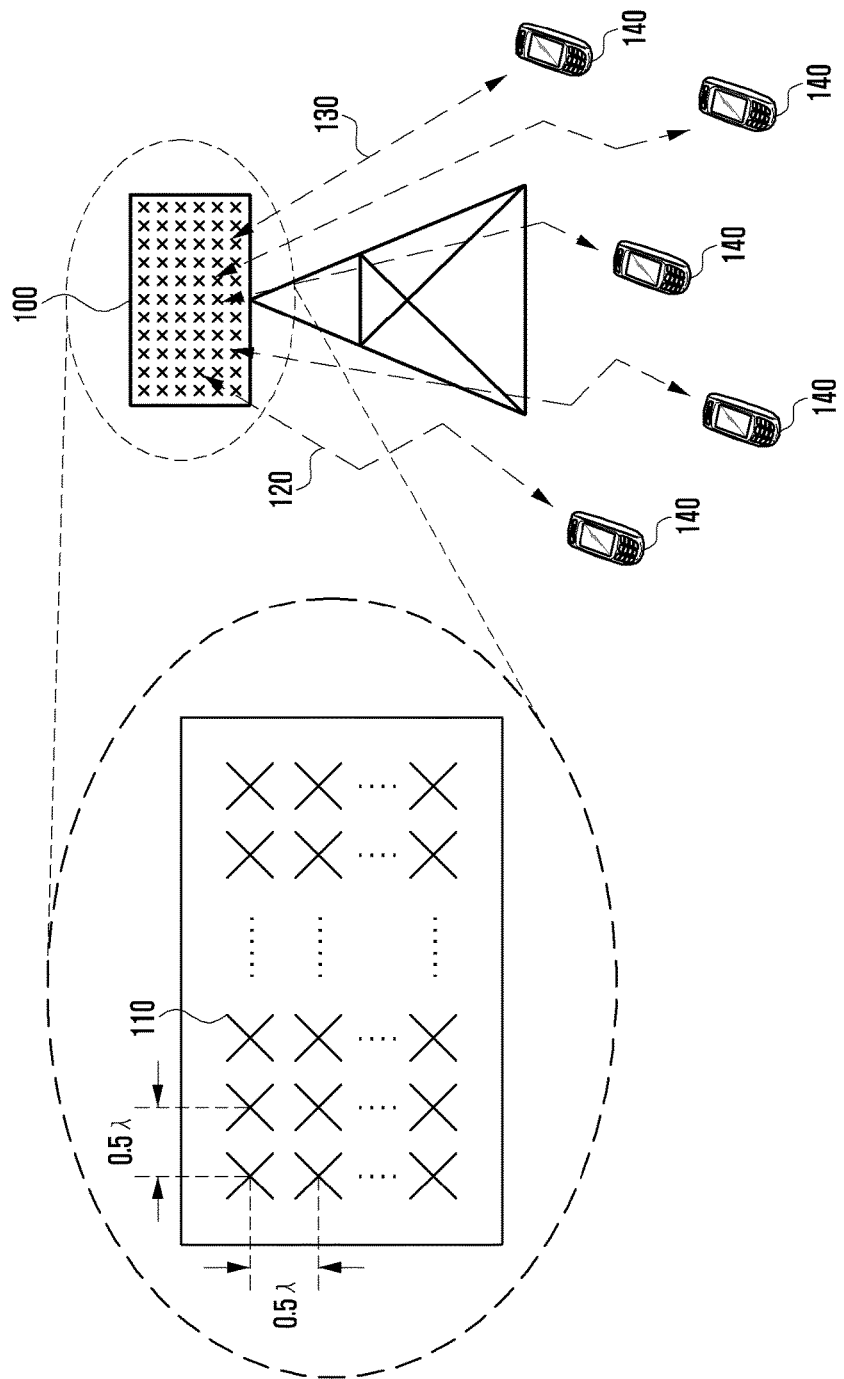
FIG. 1 is a diagram illustrating a conventional FD-MIMO system.
Figure 2:
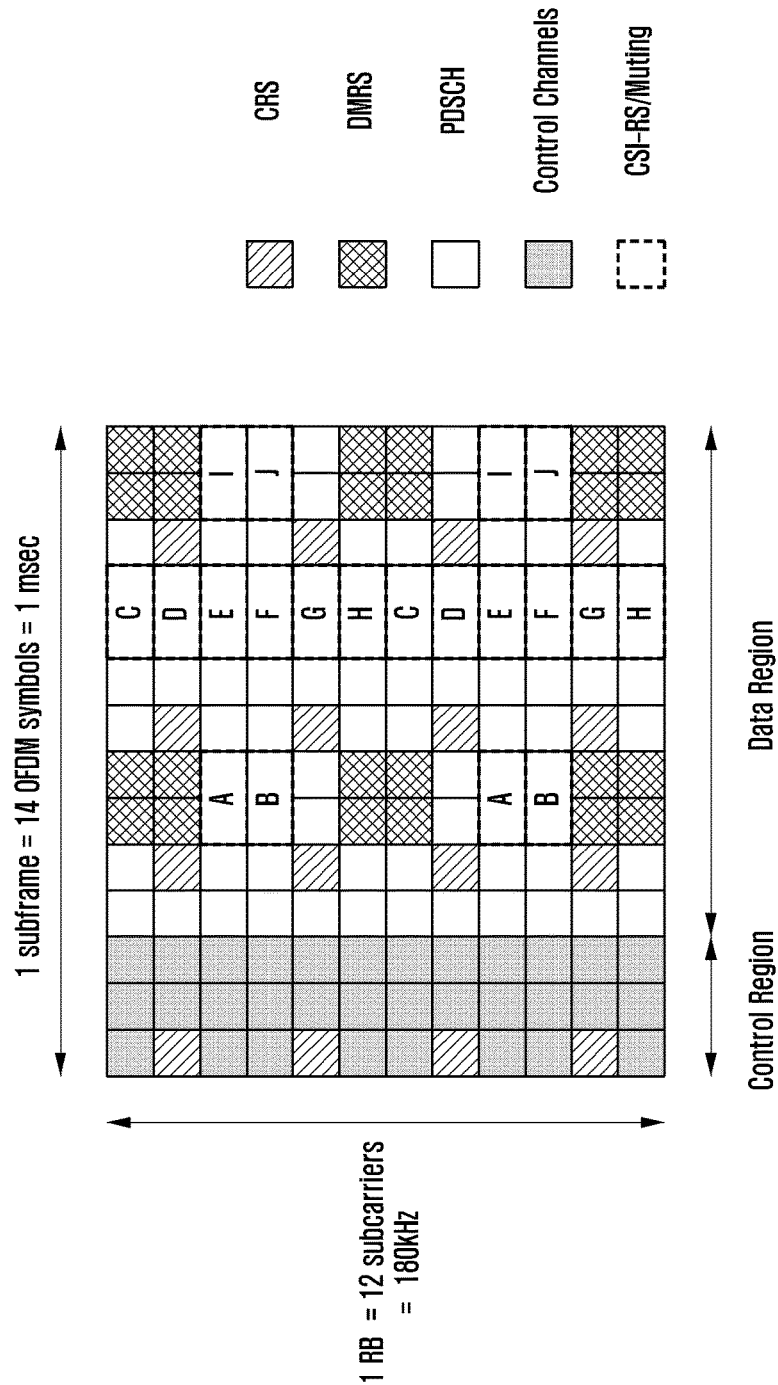
FIG. 2 is a time-frequency grid illustrating a conventional single Resource Block (RB) of a downlink subframe as a smallest scheduling unit in the LTE/LTE-A system.
Figure 3:
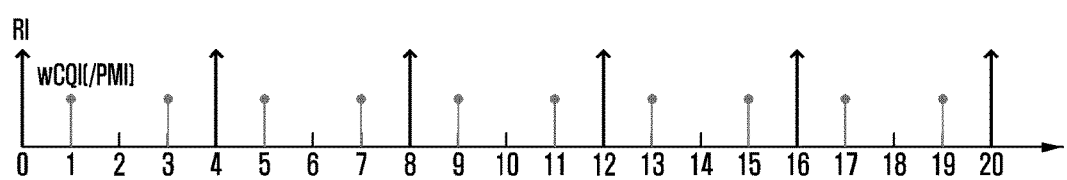
FIGS. 3 to 6 are diagram illustrating conventional feedback timings for use transmitting feedback informations.
Figure 4:
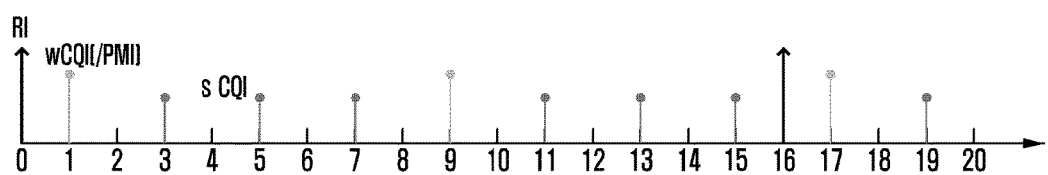
Figure 5:
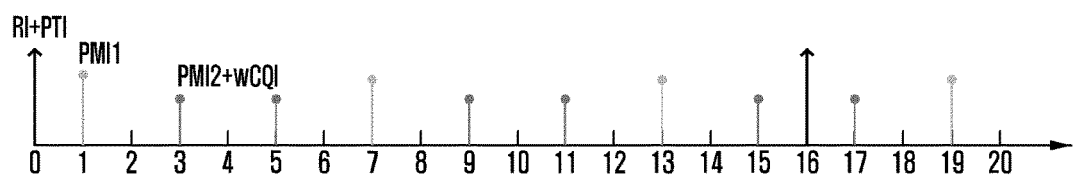
Figure 6:
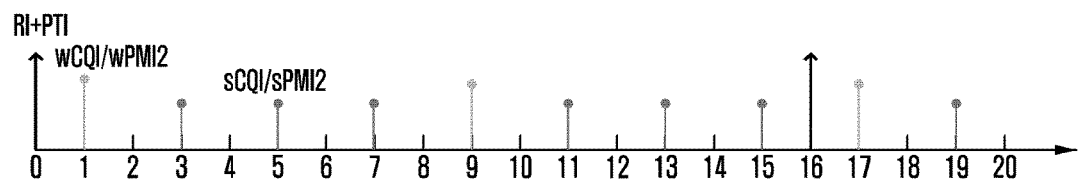

In order to make it possible for the UE to measure the channels of the plurality of transmission antennas while preventing the eNB, having a plurality of transmit antennas like FD-MIMO, from allocating an excessively large amount of radio resource for CSI-RS transmission, it can be configured to transmit CSI-RSs in N dimensions. In a case in which the transmission antennas of the eNB are arranged in 2 dimensions as shown in FIG. 2, it is possible to transmit CSI-RSs in 2 dimensions separately.

According to this principle, the reference signals transmitted from the eNB to the UE may be classified into the first CSI-RS and second CSI-RS. According to an embodiment of the present invention, the two types of reference signals that are sorted may be differentiated in a horizontal direction and a vertical direction such that one CSI-RS is used for horizontal direction channel information (horizontal CSI-RS) and the other for vertical direction channel information (vertical CSI-RS). Although it is not mandatory to classify the reference signals into the horizontal and vertical components for implementing the present invention, the description is made under the assumption that the reference signals are classified into horizontal CSI-RS and vertical CSI-RS for simplifying the explanation.

Figure 7:
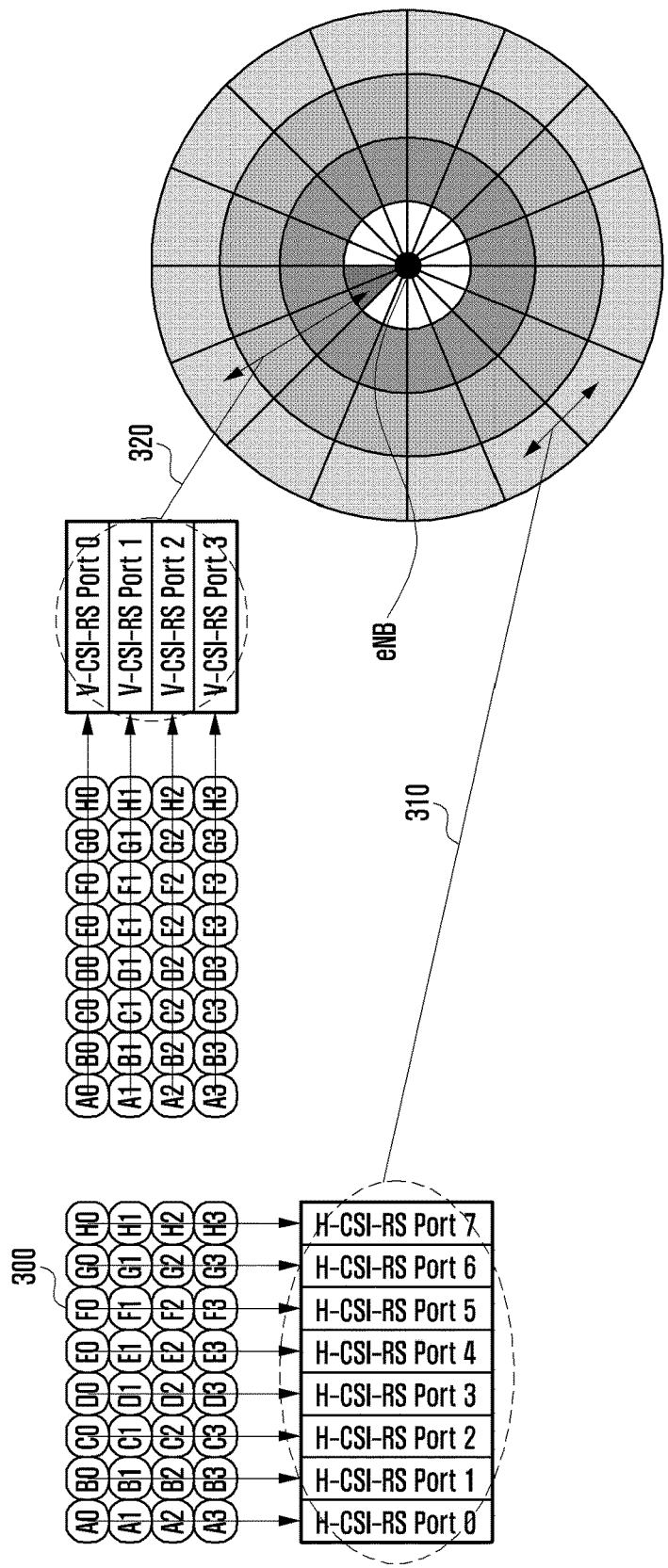
FIG. 7 is a diagram illustrating a mechanism of CSI-RS transmission in FD-MIMO system according to an embodiment of the present invention.

FIG. 7 is a diagram illustrating a mechanism of CSI-RS transmission in FD-MIMO system according to an embodiment of the present invention.

Referring to FIG. 7, the eNB operating in FD-MIMO mode has a total 32 antennas. Although the number of antennas may vary depending on the embodiment, FIG. 7 is directed to the case in which the number of antennas is 32. In FIG. 7, the 32 antennas 300 are indicated by A0 . . . A3, B0 . . . B3, C0 . . . C3, D0 . . . D3, E0 . . . E3, F0 . . . F3, G0 . . . G3, and H0 . . . H3. Two CSI-RSs are transmitted through the 32 antennas. The antenna ports corresponding to H-CSI-RS for use in measuring horizontal channel state consist of the following 8 antenna ports.

H-CSI-RS port 0: group of antennas A0, A1, A2, and A3
H-CSI-RS port 1: group of antennas B0, B1, B2, and B3
H-CSI-RS port 2: group of antennas C0, C1, C2, and C3
H-CSI-RS port 3: group of antennas D0, D1, D2, and D3
H-CSI-RS port 4: group of antennas E0, E1, E2, and E3
H-CSI-RS port 5: group of antennas F0, F1, F2, and F3
H-CSI-RS port 6: group of antennas G0, G1, G2, and G3
H-CSI-RS port 7: group of antennas H0, H1, H2, and H3

The expression of grouping a plurality of antennas into one CSI-RS port is a concept including antenna virtualization. Typically, the antenna virtualization is through linear combination of plural antennas. The antenna ports corresponding to V-CSI-RS for use in measuring vertical channel state consist of the following 4 antenna ports.

V-CSI-RS port 0: group of antennas A0, B0, C0, D0, E0, F0, G0, and H0
V-CSI-RS port 1: group of antennas A1, B1, C1, D1, E1, F1, G1, and H1

V-CSI-RS port 2: group of antennas A2, B2, C2, D2, E2, F2, G2, and H2

V-CSI-RS port 3: group of antennas A3, B3, C3, D3, E3, F3, G3, and H3

In the case that a plurality of antenna are arranged 2-dimensionally in an M×N (vertical direction×horizontal direction) matrix, the FD-MIMO channels may be measured using N horizontal direction CSI-RS ports and M CSI-RS ports. That is, when using two CSI-RSs, M+N CSI-RS ports are required for checking the channel state for M×N transmission antennas. It is advantageous to use a relatively small number of CSI-RS ports for checking the information on the relatively large number of the transmission antennas in reducing CSI-RS overhead. In the above case, the channel information on the FD-MIMO transmission antennas is acquired using two CSI-RSs, and this approach can be applied to the case of using K CSI-RSs in the same manner.

In FIG. 7, the 32 transmission antennas are mapped to 8 H-CSI-RS ports and 4 V-CSI-RS ports in order for the UE to measure the radio channels of the FD-MIMO system based thereon. The H-CSI-RS may be used for estimating the horizontal angle between the UE and the eNB transmission antennas as denoted by reference number 310, while the V-CSI-RS may be used for estimating the vertical angle between the UE and the eNB transmission antennas as denoted by reference number 320

The UE measures the channels based on the plurality of CSI-RSs and transmits RI, PMI, and CQI generated using the measurement result to the eNB so as to notify the eNB of the radio channels of the FD-MIMO system.

Figure 8:
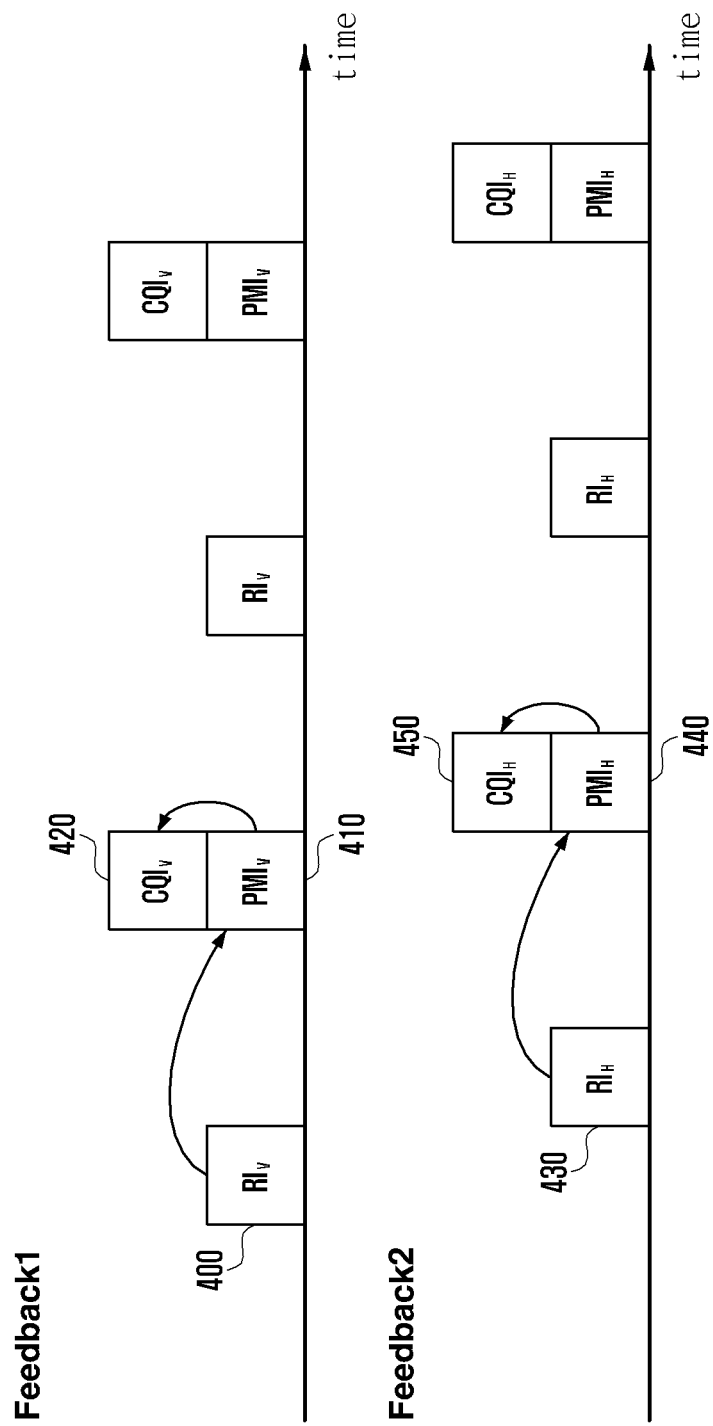
FIG. 8 is a diagram illustrating a mechanism of transmitting RI, PMI, and CQI based on two CSI-RS in the feedback method according to an embodiment of the present invention.

FIG. 8 is a diagram illustrating a mechanism of transmitting RI, PMI, and CQI based on two CSI-RS in the feedback method according to an embodiment of the present invention.

In FIG. 8, the UE is assigned the first feedback information (feedback 1) and the second feedback information (feedback 2) as independent feedback information for V-CSI-RS and H-CSI-RS. That is, the UE measures the V-CSI-RS to feed back the channel state information of feedback 1 and measures the H-CSI-RS to feed back the channel state information of feedback 2.

The RI, PMI, and CQI are transmitted in a state of being correlated to each other. In the case of feedback 1, the RIV indicates the rank of the precoding matrix indicated by the PMIV. Also, CQIV indicates the data rate supported by the UE or the value corresponding thereto in the case in which the eNB precoding matrix of the corresponding rank, which is indicated by PMIV, when the eNB performs transmission at the rank indicated by RIV. Like feedback 1, the RI, PMI, and CQI are transmitted in the state of being correlated to each other in feedback 2.

In the feedback method shown in FIG. 8, the UE is allocated two CSI-RS resources {CSI-RS-1, CSI-RS-2} from the eNB when it is assigned feedbacks for FD-MIMO. That is, the UE receives two CSI-RSs from the eNB for channel measurement. At this time, the UE may have no capability of checking whether the two CSI-RSs correspond to V-CSI-RS or H-CSI-RS. Afterwards, the UE is assigned two feedbacks through Radio Resource Control (RRC) information formatted as shown in Table 1.

TABLE 1

| First feedback information (Feedback 1) | Second feedback information (Feedback 2) |
| --- | --- |
| CSI-RS information: CSI-RS-1 Reporting mode | CSI-RS information: CSI-RS-2 Reporting mode |

TABLE 1-continued

| First feedback information (Feedback 1) | Second feedback information (Feedback 2) |
| --- | --- |
| Feedback timing PMI codebook information Additional information | Feedback timing PMI codebook information Additional information |

In Table 1, the RRC information on feedback 1 and feedback 2 are assigned independently, and the PMI codebook information refers to the information on the set of precoding matrices capable of being used for corresponding feedback. If no PMI codebook information is included in the RRC information for feedback, it is assumed that all precoding matrices defined in the standard can be used for feedback.

It can be one of the channel state information report methods to configure a plurality of feedbacks for a plurality of transmission antennas of the FD-MIMO eNB and let the UE report channel state information to the eNB as shown in FIG. 8.

This method is advantageous in that no extra implementation is necessary for the UE to generate the channel state information for FD-MIMO. However, the channel state information report method of FIG. 8 suffers from a drawback in that it is difficult to expect enough performance gain in the FD-MIMO system.

The reason for the lack of FD-MIMO system performance is because the UE cannot provide the CQI generated under the assumption of the precoding for FD-MIMO with the report of the channel state information on which the configuration of the plurality of feedbacks using the plurality of CSI-RSs as shown in FIG. 8.

A more detailed description of this concept will be made hereinafter. In the case in which a plurality of transmission antennas are arranged 2-dimensionally in the FD-MIMO system, as shown in FIG. 7, both the vertical and horizontal direction precodings are applied for the UE. That is, the UE receives the signal to which the precodings corresponding to $PMI_H$ and $PMI_V$ are applied of FIG. 8 but not one of them. However, if the UE reports the $CQI_H$, $CQI_V$ for the case of applying the precodings corresponding to $PMI_H$ and $PMI_V$ separately, the eNB does not receive the CQI for the case in which both the vertical and horizontal direction precodings are applied and thus has to determine the CQI when both the precodings are applied in itself. If the eNB determine a certain CQI for the case in which both the vertical and horizontal direction precodings are applied, this may cause degradation in the system performance.

In an embodiment of the present invention, the UE is assigned two CSI-RSs corresponding to the vertical and horizontal direction and feeds back the CQI for the case in which both the vertical and horizontal direction precodings are applied as well as RI, $PMI_H$, and $PMI_V$ as the feedback information necessary for FD-MIMO. That is, the UE generates the CQI for the case in which both the vertical and horizontal direction precodings are applied, as described hereinafter, and feeds back the generated CQI to the eNB.

Embodiment 1

Figure 9:
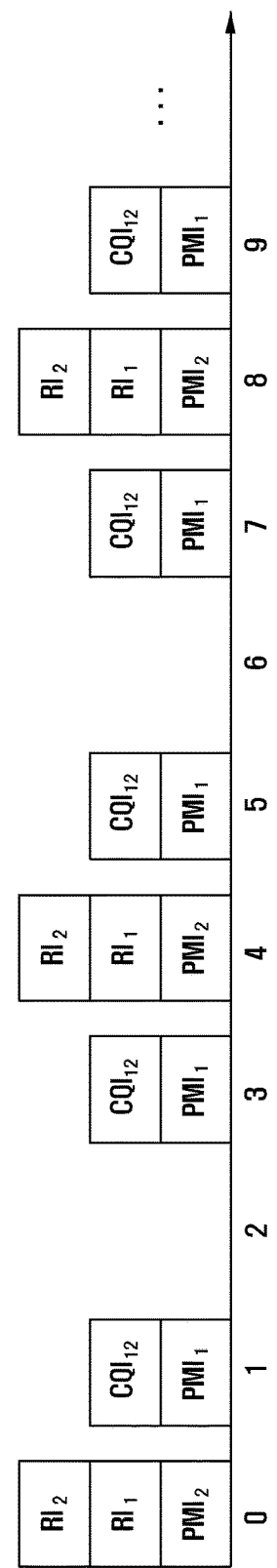
FIG. 9 is a diagram illustrating a mechanism of transmitting RI, PMI, and CQI corresponding to two CSI-RSs according to an embodiment of the present invention.

FIG. 9 is a diagram illustrating a mechanism that transmits RI, PMI, and CQI corresponding to two CSI-RSs according to an embodiment of the present invention.

In FIG. 9, the UE reports first and second feedback channel state information according to a feedback configuration based on two CSI-RSs unlike the embodiment of FIG. 8. That is, the feedback configuration for the two CSI-RSs is structured as shown in Table 2.

TABLE 2

Feedback Configuration

First channel information (horizontal channel): CSI-RS-1
Second channel information (vertical channel): CSI-RS-2
Reporting (feedback) mode: FD-MIMO mode 1
Feedback timing
PMI codebook information for first channel information
PMI codebook information for second channel information
Additional information The feedback configuration of Table 2 is directed to a case for two CSI-RSs {CSI-RS-1, CSI-RS-2} indicating the inclusion of the first channel information (horizontal channel) for CSI-RS-1 and the second channel information (vertical channel) for CSI-RS-2 respectively. Although it is assumed that the first and second channel information correspond to the horizontal and vertical direction CSI-RSs, respectively, in this embodiment, the present invention is not limited thereto and may be embodied in such a way that the first and second channel informations correspond to the vertical and horizontal direction CSI-RSs, respectively.

The feedback configuration of Table 2 includes the type of the feedback information to be generated and reported by the UE in the form of a feedback mode. If the UE is configured with FD-MIMO mode 1, this means that the UE generates the RIs (i.e., $RI_1$ and $RI_2$) and PMIs (i.e., $PMI_1$ and $PMI_2$) corresponding to CSI-RS-1 and CSI-RS-2 and then CQI (i.e. $CQI_{12}$) for the case in which precoding is applied in both the vertical and horizontal directions such that the $CQI_{12}$ and $PMI_1$ are fed back at a time (first time) simultaneously and $RI_1$, $RI_2$, and $PMI_2$ are fed back at another time (second time) simultaneously.

At this time, the feedback timing information may include the two parameters $N_{pd}$ and $N_{OFFSET,CQI}$ for configuring feedback interval and offset of $CQI_{12}$ and $PMI_1$ and two other parameters $M_{RI}$ and $N_{OFFSET,RI}$ for configuring the feedback interval and offset of $RI_1$, $RI_2$, and $PMI_2$. That is, the feedback information and feedback timings are configured as follows in an embodiment of the present invention.

$CQI_{12}$, $PMI_1$: Fed back at every subframe $N_{pd}$ with offset $N_{OFFSET,CQI}$.
Feedback interval: $N_{pd}$
Feedback offset: $N_{OFFSET,CQI}$
$RI_1$, $RI_2$, $PMI_2$: Feedback, if performed, at every subframe $M_{RI}*N_{pd}$ with offset $N_{OFFSET,CQI}+N_{OFFSET,RI}$.
Feedback interval: $M_{RI}*N_{pd}$
Feedback offset: $N_{OFFSET,CQI}+N_{OFFSET,RI}$ Although the description is directed to the case in which the UE's feedback for FD-MIMO includes both the $RI_1$ and $RI_2$, it is possible to feed back only $RI_1$ while $RI_2$ is fixed to 1 by taking notice of the channel characteristic in that the vertical direction transmission is not dispersed significantly. $RI_1$ and $RI_2$ may be encoded into $RI_{12}$ to be fed back as shown in Table 3 instead of being encoded into separate information.

TABLE 3

| $RI_{12}$ | Horizontal direction rank | Vertical direction rank |
|---|---|---|
| 000 | 1 | 1 |
| 001 | 2 | 1 |

TABLE 3-continued

| $RI_{12}$ | Horizontal direction rank | Vertical direction rank |
|---|---|---|
| 010 | 3 | 1 |
| 011 | 4 | 1 |
| 100 | 1 | 2 |
| 101 | 2 | 2 |
| 110 | 3 | 2 |
| 111 | 4 | 2 |

The PMI codebook information refers to the information on the set of precoding matrices capable of being used for the corresponding channel and may be configured for each of the vertical and horizontal directions. If the PMI codebook information includes no RRC information for feedback, it is assumed that all precoding matrices defined in the standard can be used.

Also, it is necessary to define how to determine the CQI in a case in which a plurality of precodings are applied (i.e., CQI when precoding is applied in both the vertical and horizontal directions as described above). In the case of CQI to which only one precoding has been applied, the UE calculates CQI under the assumption that the precoding designated based on RI and PMI, which it has reported, is applied in downlink. In the case of $CQI_{12}$, however, the UE calculates CQI ($CQI_{12}$) under the assumption that the two precodings, i.e. precoding 1 generated based on $RI_1$ and $PMI_1$ and precoding 2 generated based on $RI_2$ and $PMI_2$, are applied in downlink simultaneously. At this time, the UE may interpret the application of two simultaneous precodings as a Kronecker product. The Kronecker product is defined with two matrices as follows:

$$A \otimes B = \begin{bmatrix} a_{11}B & \cdots & a_{1n}B \\ \vdots & \ddots & \vdots \\ a_{m1}B & \cdots & a_{mn}B \end{bmatrix}, \quad (1)$$

where $$A = \begin{bmatrix} a_{11} & \cdots & a_{1n} \\ \vdots & \ddots & \vdots \\ a_{m1} & \cdots & a_{mn} \end{bmatrix}.$$

In Equation (1), it is possible to acquire the precoding for the case in which two precodings are applied by replacing A and B with the precoding matrices indicated by the respective $PMI_1$ and $PMI_2$. For $CQI_{12}$, the UE calculates CQI under the assumption that the precoding acquired by applying Equation (1) to the precoding matrices indicated $PMI_1$ and $PMI_2$ is applied in downlink.

In this embodiment, it is considered that the channel varies differently in vertical and horizontal directions such that, if the channel varies frequently in the horizontal direction, the horizontal and vertical direction CSI-RSs are mapped to the first and second channel information of Table 2, respectively. Alternatively, the vertical and horizontal CSI-RSs may be mapped to the first and second channel information, respectively. For example, the frequently varying component may be changed depending on whether the user moves vertically in a building or horizontally on even ground.

Embodiment 2

Figure 10:
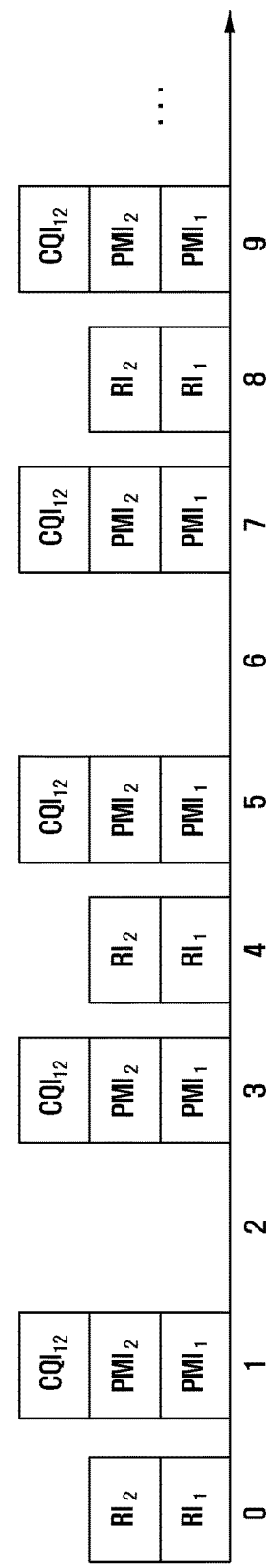
FIG. 10 is a diagram illustrating a mechanism of transmitting RI, PMI, and CQI corresponding to two CSI-RSs according to an embodiment of the present invention.

FIG. 10 is a diagram illustrating a mechanism for transmission of RI, PMI, and CQI corresponding to two CSI-RSs according to another embodiment of the present invention.

In this embodiment, $CQI_{12}$, $PMI_1$, and $PMI_2$ are fed back simultaneously at a timing (first timing) and $RI_1$, $RI_2$ are feedback simultaneously at another time (second timing).

In FIG. 10, the UE reports the channel state information based on two CSI-RSs according to the feedback configuration based on two CSI-RS as in the embodiment of FIG. 9. In this embodiment, the feedback configuration for two CSI-RSs is structured as shown in Table 4.

TABLE 4

Feedback Configuration

First channel information (horizontal channel): CSI-RS-1
Second channel information (vertical channel): CSI-RS-2
Reporting (feedback) mode: FD-MIMO mode 2
Feedback timing
PMI codebook information for first channel information
PMI codebook information for second channel information
Additional information The feedback configuration of Table 4 is directed to a case for two CSI-RS {CSI-RS-1, CSI-RS-2} indicating the inclusion of the first channel information (horizontal channel) for CSI-RS-1 and the second channel information (vertical channel) for CSI-RS-2. Although it is assumed that the first and second channel information correspond to the horizontal and vertical direction CSI-RSs, respectively, in this embodiment, the present invention is not limited thereto but may be embodied in such a way that the first and second channel informations correspond to the vertical and horizontal direction CSI-RSs, respectively.

The feedback configuration of Table 4 includes the type of the feedback information to be generated and reported by the UE in the form of a feedback mode. If the UE is configured with FD-MIMO mode 2, this means that the UE generates the RIs (i.e. RI1 and $RI_2$) and PMIs (i.e. $PMI_1$ and $PMI_2$) corresponding to CSI-RS-1 and CSI-RS-2 and then CQI (i.e. $CQI_{12}$), for the case where precoding is applied in both the vertical and horizontal directions, such that the $CQI_{12}$ and $PMI_1$ and $PMI_2$ are fed back at a timing (first timing) simultaneously and $RI_1$ and $RI_2$ are fed back at another timing (second timing) simultaneously.

At this time, the feedback timing information may include the two parameters $N_{pd}$, $N_{OFFSET,CQI}$ for configuring feedback interval and offset of the $CQI_{12}$, $PMI_1$ and two other parameters $M_{RI}$ and $N_{OFFSET,RI}$ for configuring the feedback interval and offset of $RI_1$ and $RI_2$. That is, the feedback information and feedback timings are configured as follows in an embodiment of the present invention.

$CQI_{12}$, $PMI_1$, $PMI_2$: Fed back at every subframe $N_{pd}$ with offset $N_{OFFSET,CQI}$.

Feedback interval: $N_{pd}$

Feedback offset: $N_{OFFSET,CQI}$ $RI_1$, $RI_2$: Fed back at every subframe $M_{RI}*N_{pd}$ with offset $N_{OFFSET,CQI}+N_{OFFSET,RI}$.

Feedback interval: $M_{RI}*N_{pd}$

Feedback offset: $N_{OFFSET,CQI}+N_{OFFSET,RI}$

Although the description is directed to the case in which the UE's feedback for FD-MIMO includes both the $RI_1$, $RI_2$, it is possible to feed back only $RI_1$ while $RI_2$ is fixed to 1 by taking notice of the channel characteristic in that the vertical direction transmission is not dispersed significantly. $RI_1$ and $RI_2$ may be encoded into $RI_{12}$ to be fed back as shown in Table 5 instead of being encoded into separate information.

TABLE 5

| $RI_{12}$ | Horizontal direction rank | Vertical direction rank |
|---|---|---|
| 000 | 1 | 1 |
| 001 | 2 | 1 |
| 010 | 3 | 1 |
| 011 | 4 | 1 |
| 100 | 1 | 2 |
| 101 | 2 | 2 |
| 110 | 3 | 2 |
| 111 | 4 | 2 |

The PMI codebook information refers to the information on the set of precoding matrices capable of being used for the corresponding channel and may be configured for each of the vertical and horizontal directions. If the PMI codebook information includes no RRC information for feedback, it is assumed that all precoding matrices defined in the standard can be used.

Also, it is necessary to define how to determine the CQI in case a plurality of precodings are applied (i.e., CQI when precoding is applied in both the vertical and horizontal directions, as described above). In the case of CQI to which only one precoding has been applied, the UE calculates CQI under the assumption that the precoding designated based on RI and PMI, which it has reported, is applied in downlink. In the case of $CQI_{12}$, however, the UE calculates CQI ($CQI_{12}$) under the assumption that the two precodings, i.e. precoding 1 generated based on $RI_1$ and $PMI_1$ and precoding 2 generated based on $RI_2$, and $PMI_2$ are applied in downlink simultaneously. At this time, the UE may interpret the application of two simultaneous precodings as a Kronecker product. The Kronecker product is defined with two matrices as follows. As described in the first embodiment, it is possible to acquire the precoding for the case in which two precodings are applied by replacing A and B of Equation (1) with the precoding matrices indicated by the respective $PMI_1$ and $PMI_2$. For $CQI_{12}$, the UE calculates CQI under the assumption that the precoding acquired by applying Equation (1) to the precoding matrices indicated $PMI_1$ and $PMI_2$ is applied in downlink.

In this embodiment, $PMI_1$ and $PMI_2$ are fed back simultaneously at the same timing taking into consideration that the channel varies at similar speeds in vertical and horizontal directions.

Embodiment 3

Figure 11A:
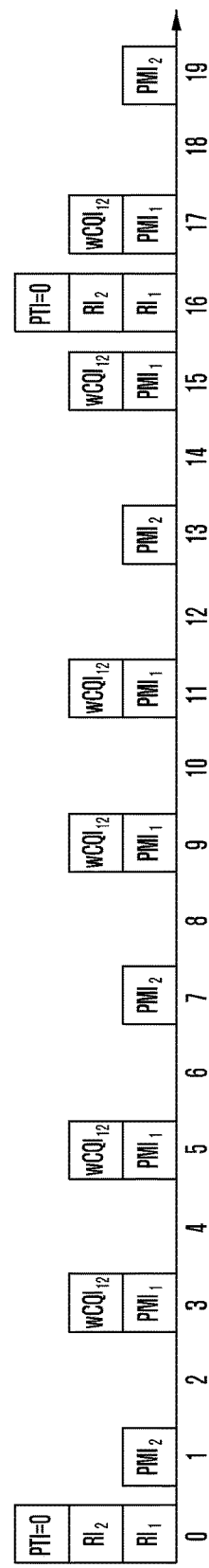
FIGS. 11A and 11B are diagrams illustrating mechanisms of transmitting RI, PMI, and CQI corresponding to two CSI-RSs according to an embodiment of the present invention.
Figure 11B:
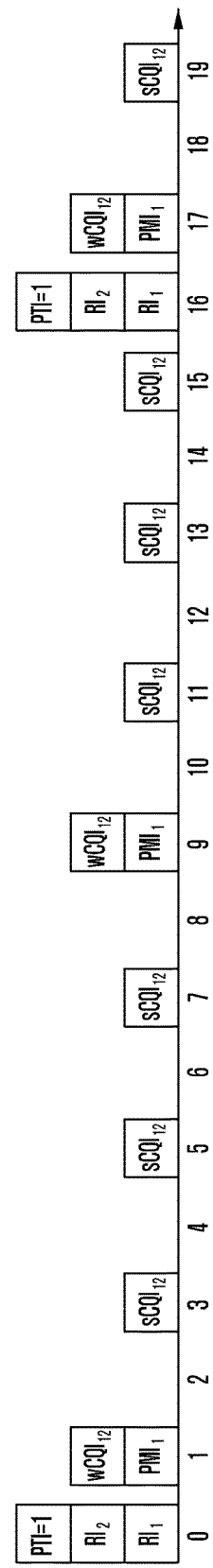

FIGS. 11A and 11B are diagrams illustrating mechanisms of transmitting RI, PMI, and CQI corresponding to two CSI-RSs according to another embodiment of the present invention.

Unlike the first and second embodiments, the UE may further transmit a Precoding Type Indicator (PTI) along with two CQIs of wCQI and sCQI. Here, PTI is fed back at the same timing as the RI, and the feedback type and timing are changed afterward depending on whether the PTI is set to 0 or 1.

In FIGS. 11A and 11B, the UE reports the channel state information corresponding to two CSI-RSs of one feedback configuration as in FIGS. 9 and 10. In this embodiment, the feedback configuration for two CSI-RSs is structured as shown in Table 6.

TABLE 6

Feedback Configuration

First channel information (horizontal channel): CSI-RS-1
Second channel information (vertical channel): CSI-RS-2
Reporting (feedback) mode: FD-MIMO mode 3
Feedback timing
PMI codebook information for first channel information
PMI codebook information for second channel information
Additional information The feedback configuration of Table 6 is directed to a case for two CSI-RS {CSI-RS-1, CSI-RS-2} indicating the inclusion of the first channel information (horizontal channel) for CSI-RS-1 and the second channel information (vertical channel) for CSI-RS-2. Although it is assumed that the first and second channel information correspond to the horizontal and vertical direction CSI-RSs, respectively, in this embodiment, the present invention is not limited thereto but may be embodied in such a way that the first and second channel information correspond to the vertical and horizontal direction CSI-RSs, respectively.

The feedback configuration of table 6 includes the types of the feedback information to be generated and reported by the UE as feedback mode information. If the UE is configured with FD-MIMO mode 3, this means that the UE generates the RIs (i.e. RI1 and $RI_2$) and PMIs (i.e. $PMI_1$ and $PMI_2$) corresponding to CSI-RS-1 and CSI-RS-2 and then wCQI (i.e. $wCQI_{12}$) and sCQI ($sCQI_{12}$) for the case in which precoding is applied in both the vertical and horizontal directions such that $wCQI_{12}$ and $PMI_1$ are fed back at a timing (first timing) simultaneously, PMI2 at another timing (second timing), and $RI_1$ and $RI_2$ and PTI as still another (third timing) simultaneously, for the case of PTI=1.

In the FD-MIMO mode 3, if PTI is set to 1, this means that the UE feeds back $sCQI_{12}$ at a predetermined timing (first timing), $wCQI_{12}$ and $PMI_1$ at another timing (second timing) simultaneously, and $RI_1$, $RI_2$, and PTI at still another timing (third timing) simultaneously.

The feedback timing information may include $wCQI_{12}$ and $PMI_1$ for PTI=0 and two parameters $N_{pd}$ and $N_{OFFSET,CQI}$ for configuring the interval and offset of $sCQI_{12}$ for PTI=1, a parameter H=J*K+1 for configuring $wCQI_{12}$ and $PMI_1$ for PTI=1, two parameters $M_{RI}$ and $N_{OFFSET,RI}$ for defining interval and timing of $RI_1$, $RI_2$, and PTI, and H' value for configuring interval of $PMI_2$ for PTI=0. Here, J is the information determined by the downlink system bandwidth and is set to 3 in the 10 MHz system. In this embodiment, the feedback information and feedback timings are configured as follows.

If PTI=0,
  wCQI12, $PMI_1$: Fed back at every subframe $N_{pd}$ with offset $N_{OFFSET,CQI}$.
    Feedback interval: $N_{pd}$
    Feedback offset: $N_{OFFSET,CQI}$.
  $PMI_2$: Fed back at every subframe H'*$N_{pd}$ with offset $N_{OFFSET,CQI}$.
  That is, feedback information is replaced by $PMI_2$ at every H' times of $wCQI_{12}$ and $PMI_1$ feedback transmission.
    Feedback interval: H'*$N_{pd}$
    Feedback offset: $N_{OFFSET,CQI}$
  $RI_1$, $RI_2$, and PTI: Fed back at every $M_{RI}$*H*$N_{pd}$ subframes with offset $N_{OFFSET,CQI}$+$N_{OFFSET,RI}$.
    Feedback interval: $M_{RI}$*H*$N_{pd}$
    Feedback offset: $N_{OFFSET,CQI}$+$N_{OFFSET,RI}$ If PTI=1,
  $sCQI_{12}$: Fed back at every $N_{pd}$ subframes with offset $N_{OFFSET,CQI}$.
    Feedback interval: $N_{pd}$
    Feedback offset: $N_{OFFSET,CQI}$
  wCQI12, $PMI_1$: Fed back at every H*$N_{pd}$ subframes with offset $N_{OFFSET,CQI}$.
  That is, the feedback information is replaced by $wCQI_{12}$ and $PMI_1$ at every H times of $sCQI_{12}$ feedback transmission.
    Feedback interval: H*$N_{pd}$
    Feedback offset: $N_{OFFSET,CQI}$
  $RI_1$, $RI_2$, and PTI: Fed back at $M_{RI}$*H*$N_{pd}$ every subframes with offset $N_{OFFSET,CQI}$+$N_{OFFSET,RI}$.
    Feedback interval: $M_{RI}$*H*$N_{pd}$
    Feedback offset: $N_{OFFSET,CQI}$+$N_{OFFSET,RI}$ Although the description is directed to the case in which the UE's feedback for FD-MIMO includes both the $RI_1$, $RI_2$, it is possible to feed back only $RI_1$ while $RI_2$ is fixed to 1 by taking notice of the channel characteristic in that the vertical direction transmission is not dispersed significantly. $RI_1$ and $RI_2$ may be encoded into $RI_{12}$ to be fed back as shown in Table 7 instead of being encoded into separate information.

TABLE 7

| $RI_{12}$ | Horizontal direction rank | Vertical direction rank |
|---|---|---|
| 000 | 1 | 1 |
| 001 | 2 | 1 |
| 010 | 3 | 1 |
| 011 | 4 | 1 |
| 100 | 1 | 2 |
| 101 | 2 | 2 |
| 110 | 3 | 2 |
| 111 | 4 | 2 |

The PMI codebook information refers to the information on the set of precoding matrices capable of being used for the corresponding channel and may be configured for each of the vertical and horizontal directions. If the PMI codebook information includes no RRC information for feedback, it is assumed that all precoding matrices defined in the standard can be used.

Also, it is necessary to define how to determine the CQI in case a plurality of precodings are applied (i.e., CQI when precoding is applied in both the vertical and horizontal directions, as described above). In the case of CQI, to which only one precoding has been applied, the UE calculates CQI under the assumption that the precoding designated based on RI and PMI, which it has reported, is applied in downlink. In the case of $CQI_{12}$, however, the UE calculates CQI ($CQI_{12}$) under the assumption that the two precodings, i.e. precoding 1 generated based on $RI_1$ and $PMI_1$ and precoding 2 generated based on $RI_2$ and $PMI_2$ are applied in downlink simultaneously. At this time, the UE may interpret the application of two simultaneous precodings as a Kronecker product. The Kronecker product is defined with two matrices as follows. It is possible to acquire the precoding for the case in which two precodings are applied by replacing A and B of Equation (1) with the precoding matrices indicated by the respective $PMI_1$ and $PMI_2$. For $CQI_{12}$, the UE calculates CQI under the assumption that the precoding, acquired by applying Equation (1) to the precoding matrices indicated $PMI_1$ and $PMI_2$, is applied in downlink. The UE calculates $CQI_{12}$ under the assumption that the precoding, acquired by applying the above equation to the precoding matrices indicated by PMI1 and PMI2, has been applied in downlink.

In this embodiment, it is considered that the channel varies differently in a vertical and a horizontal direction such that, if the channel varies frequently in the horizontal direction, the horizontal and vertical direction CSI-RSs are mapped to the first and second channel information of Table (6), respectively.

In embodiments 1, 2, and 3, it is necessary to assume the precoding matrices indicated by $PMI_1$ and $PMI_2$ in order for the UE to calculate $CQI_{12}$. However, it is possible that the UE and the eNB fail to share at least one of $PMI_1$ and $PMI_2$ due to the failure of detecting the feedback start time or transmitting a certain feedback. In this scenario, the UE calculates and feeds back $CQI_{12}$ under the assumption of a predetermined PMI value instead of the non-shared information and the eNB also interprets the $CQI_{12}$ under the assumption of the predetermined PMI value. For example, the failed sharing PMI may be regarded as 0 always.

Figure 12:
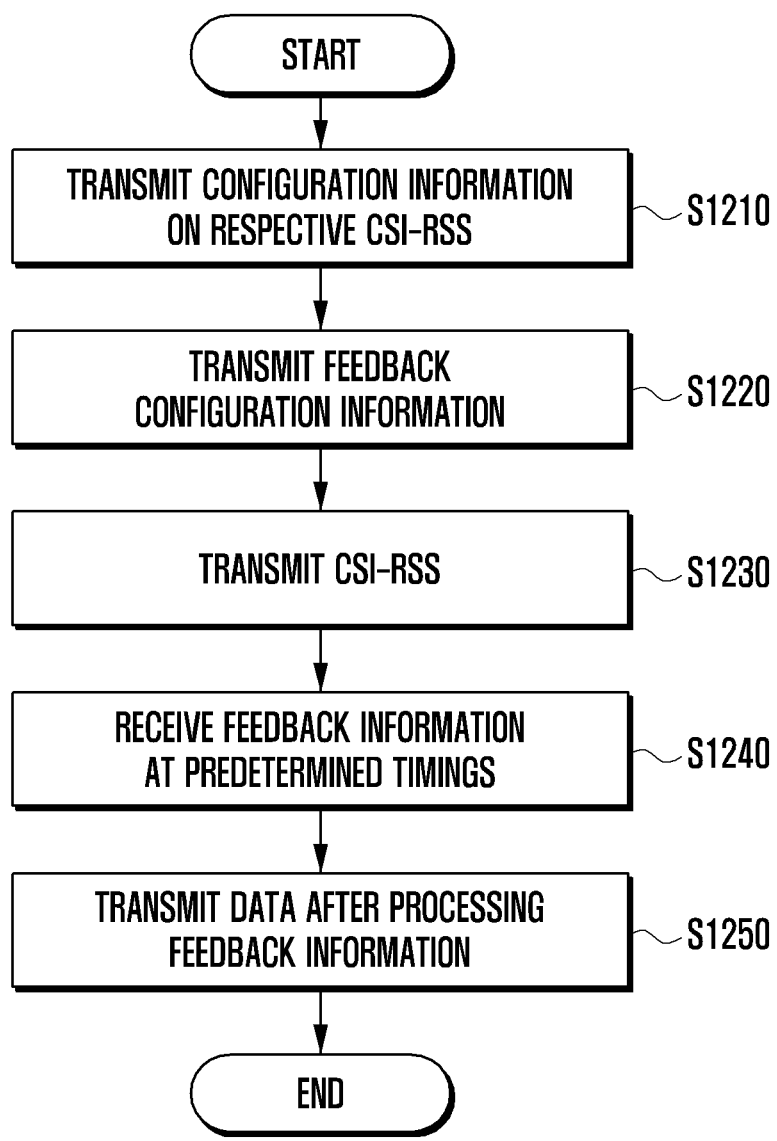
FIG. 12 is a flowchart illustrating a procedure of the eNB in the feedback method according to an embodiment of the present invention.

FIG. 12 is a flowchart illustrating a procedure of the eNB in the feedback method according to an embodiment of the present invention.

In step S1210, the eNB sends the UE the configuration information for use of a plurality of CSI-RSs (particularly, 2 CSI-RSs). The CSI-RS configuration information includes information corresponding to the subframes for transmitting CSI-RSs and resources to which the CSI-RSs are mapped in the corresponding subframe.

In step 1220, the eNB sends the UE the feedback configuration information. The feedback configuration information may include the information presented in one of Tables 2, 4, and 6 according to the corresponding embodiment of the present invention. That is, the feedback configuration information may include at least one of the indication information of receiving two CSI-RSs and corresponding feedback, a type of the feedback information to be transmitted at the same timings, feedback related parameters, and a feedback transmission mode (FD-MIMO mode).

In step S1230, the eNB sends the UE the two CSI-RSs.

In step S1240, the eNB receives the feedback information transmitted by the UE at predetermined timings. Finally, in step S1250, the eNB processes the feedback information transmitted by the UE and sends the UE data based on the processing result.

Figure 13:
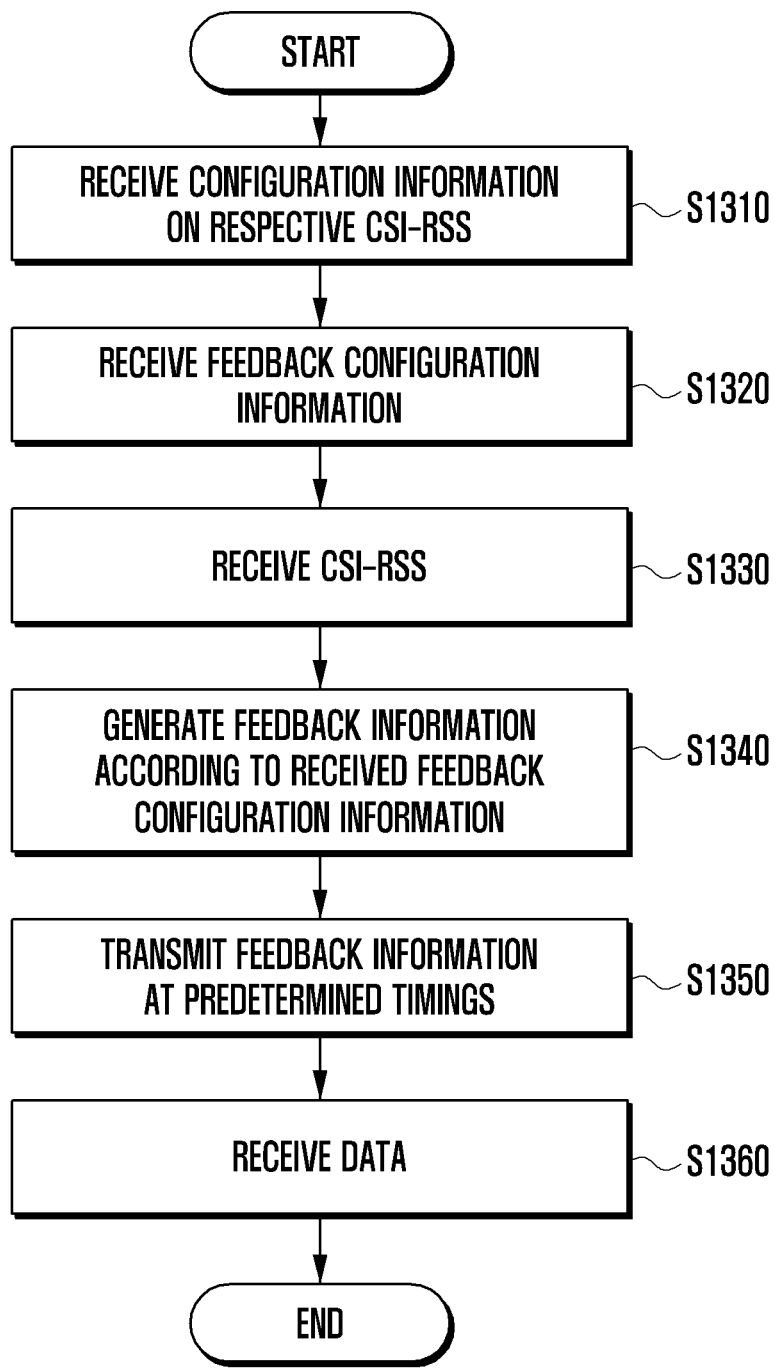
FIG. 13 is a flowchart illustrating a procedure of the UE in the feedback method according to an embodiment of the present invention.

FIG. 13 is a flowchart illustrating a procedure of the UE in the feedback method according to an embodiment of the present invention.

In step S1310, the UE receives the CSI-RS configuration information corresponding to a plurality of CSI-RSs (particularly, two CSI-RSs) transmitted by the eNB. The CSI-RS configuration information includes the information on the subframes carrying CSI-RSs and resource positions of CSI-RSs in the corresponding subframe.

In step S1320, the UE receives the feedback configuration information transmitted by the eNB. The feedback configuration information may include the information presented in one of Tables 2, 4, and 6 according to the corresponding embodiment of the present invention. That is, the feedback configuration information may include at least one of the indication information of receiving two CSI-RSs and feedback corresponding thereto, a type of the feedback information to be transmitted at the same timings, feedback related parameters, and a feedback transmission mode (FD-MIMO mode).

In step S1330, the UE receives two CSI-RSs from the eNB.

In step S1340, the UE generates the feedback information based on the received feedback configuration information. Since the feedback information to be generated for the respective cases has been described in the above embodiments already, a detailed description thereof is omitted here.

In step S1350, the UE sends the feedback information to the eNB at the predetermined timing indicated in the feedback configuration information. Finally, in step S1360, the UE receives the data transmitted by the eNB and processes the received data.

Figure 14:
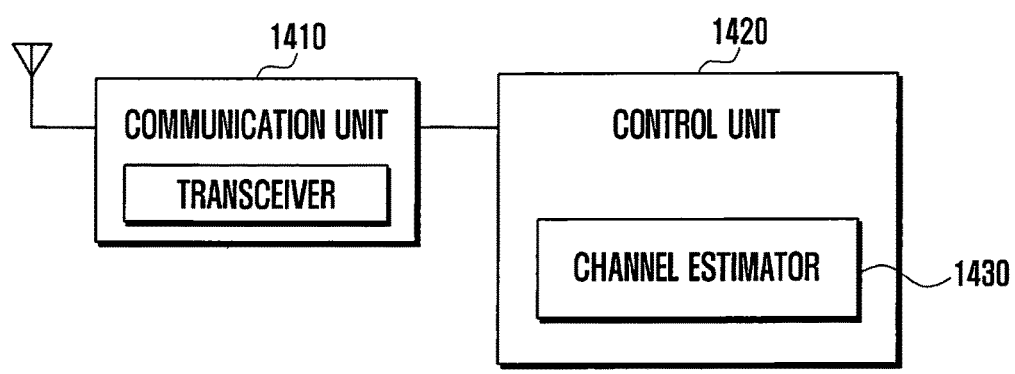
FIG. 14 is a block diagram illustrating a configuration of the UE according to an embodiment of the present invention.

FIG. 14 is a block diagram illustrating a configuration of the UE according to an embodiment of the present invention.

The communication unit 1410, e.g., a transceiver, is responsible for transmitting or receiving data to and from other devices (e.g., the eNB). Here, the communication unit 1410 may transmit the feedback information for the FD-MIMO technique under the control of the control unit 1420.

The control unit 1420 controls the states and operations of the components constituting the UE. Here, the control unit 1420 generates the feedback information for FD-MIMO according to the information allocated by the serving eNB and feeds back the channel information to the eNB according to the timing information. For this purpose, the control unit 1420 includes a channel estimator 1430.

The channel estimator 1430 determines the feedback information to be transmitted based on the CSI-RS and feedback allocation information transmitted by the eNB and estimates channels based on the received CSI-RSs.

Although the description is directed to the case where the UE is composed of the communication unit 1410 and the control unit 1420, the present invention is not limited thereto. That is, the UE may further include various components depending on the functions featured in the UE. For example, the UE may further include a display unit (not shown) for displaying current operating state of the UE, an input unit (not shown) for receiving a user input for executing a certain function, and a storage unit (not shown) for storing data generated by the UE.

Although the control unit 1420 and the channel estimator 1430 are depicted as different function blocks in FIG. 14, the present invention is not limited thereto. For example, the control unit 1420 may be also perform the functions of the channel estimator 1430.

In this case, the control unit 1420 may control the UE to receive the configuration information corresponding to at least two reference signals from the eNB. The control unit 1420 may also control the UE to measure at least two reference signals and receive the feedback configuration information from the eNB for generating feedback information based on the measurement result. The control unit 1420 receives the at least two reference signals from the eNB, measures the at least two received reference signals, and generates feedback information according to the feedback configuration information. The control unit 1420 controls the UE to transmit the feedback information to the eNB at the feedback timing indicated in the feedback configuration information.

In this case, the feedback configuration information may include at least one of the information indicating that the first reference signal corresponds to the first channel information and the second reference signal corresponds to the second channel information, a type of the feedback information to be transmitted at the first and second timings, and feedback timing-related parameters.

The feedback information may include at least one of the RI ($RI_1$) corresponding to the first reference signal, second RI ($RI_2$) corresponding to the second reference signal, first PMI ($PMI_1$) corresponding to the first reference signal, second PMI ($PMI_2$) corresponding to the second reference signal, and CQI ($CQI_{12}$) generated as a function of the first precoding, generated by the first RI and the first PMI, and the second precoding, generated by the second RI and the second PMI.

According to an embodiment of the present invention, the feedback information may be configured to carry the CQI and the first PMI at the first timing and the first RI, the second RI, and the second PMI at the second timing (FD-MIMO mode 1).

According to another embodiment of the present invention, the feedback information may be configured to carry the CQI, the first PMI, and the second PMI at the first timing and the first RI and the second RI at the second timing (FD-MIMO mode 2).

According to another embodiment of the present invention, the feedback information may be configured to carry the precoding type indicator such that the feedback information type and transmission timing are determined based on the value of the precoding type indicator (FD-MIMO mode 3).

In an embodiment of the present invention, the CQI generated by the UE corresponds to a Kronecker product of the first precoding matrix indicated by the first PMI and the second precoding matrix indicated by the second PMI.

Figure 15:
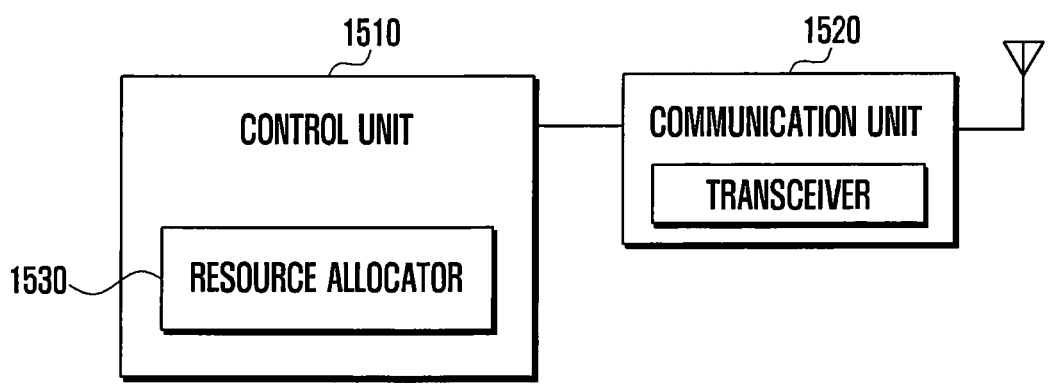
FIG. 15 is a block diagram illustrating a configuration of the eNB according to an embodiment of the present invention.

FIG. 15 is a block diagram illustrating a configuration of the eNB according to an embodiment of the present invention. Referring to FIG. 15, the eNB includes a control unit 1510 and a communication unit 1520, e.g., a transceiver.

The control unit 1510 controls the states and operations of the components of the eNB. The control unit 1510 allocates CSI-RS resources to the UE for horizontal and vertical component channel estimations, feedback resource, and feedback times. For this purpose, the control unit 1510 includes a resource allocator 1530.

The resource allocator 1530 maps the CSI-RSs to the resources for the UE to estimate vertical and horizontal component channels and transmits the CSI-RSs using the corresponding resources. The resource allocator 1530 also generates the feedback configuration and allocates the feedback timings in order to avoid collision of the feedbacks from the UE and receives and analyzes the feedback information received at the corresponding timings.

The communication unit 1520 is responsible for transmitting data and reference signals to the UE and receiving feedback information from the UE. The communication unit 1520 transmits the CSI-RSs to the UE and receives feedbacks corresponding to the channel information from the UE on the allocated resource under the control of the control unit 1510.

Although the control unit 1510 and the resource allocator 1530 are depicted as separate function blocks, the present invention is not limited to this configuration. For example, the control unit 1510 may be responsible for performing the functions of the resource allocator 1530.

In this case, the control unit 1510 may control the eNB to send the UE the configuration information corresponding to at least two reference signals and the feedback configuration information in order for the UE to measure the at least two reference signals and generate feedback information based on the measurement result.

The control unit 1510 may control the eNB to send the UE the at least two reference signals and receive the feedback information transmitted by the UE at the feedback time according to the feedback configuration information.

As described above, the feedback method of the present invention is capable of preventing the eNB, having a plurality of transmission antennas for FD-MIMO, from allocating excessive radio resource for CSI-RS transmission allowing the UE to measure the channels of the plurality of transmission antennas and reporting feedback information based on the measurement result efficiently.

While the invention has been shown and described with reference to certain embodiments thereof, it will be understood by those skilled in the art that various changes in form and detail may be made therein without departing from the spirit and scope of the invention as defined by the appended claims.

What is claimed:

1. A method for transmitting channel state information (CSI) by a user equipment (UE), the method comprising:
    receiving, from a base station, feedback configuration information including information on a plurality of channel state information reference signals (CSI-RSs) for channel measurement;
    receiving, from the base station, a first CSI-RS and a second CSI-RS;
    generating a channel quality indicator (CQI) for N antenna ports based on the information on the plurality of CSI-RSs, wherein the N antenna ports are determined based on the information on the plurality of CSI-RSs, and a number of the N antenna ports is a sum of a first number of antenna ports for the first CSI-RS and a second number of antenna ports for the second CSI-RS, and wherein N is a natural number; and
    transmitting, to the base station, the CQI for the N antenna ports.

2. The method of claim 1, further comprising:
    generating a rank indicator (RI) for the N antenna ports; and
    transmitting, to the base station, the RI for the N antenna ports.

3. The method of claim 1, wherein the information on the plurality of CSI-RSs includes codebook information corresponding to the plurality of CSI-RSs.

4. A method for receiving channel state information (CSI) by a base station, the method comprising:
    transmitting, to a user equipment (UE), feedback configuration information including information on a plurality of channel state information reference signals (CSI-RSs) for channel measurement;
    transmitting, to the UE, a first CSI-RS and a second CSI-RS; and
    receiving, from the UE, a channel quality indicator (CQI) for N antenna ports, the CQI being generated based on the information on the plurality of CSI-RSs,
    wherein N is a natural number, and
    wherein the N antenna ports are determined based on the information on the plurality of CSI-RSs, and a number of the N antenna ports is a sum of a first number of antenna ports for the first CSI-RS and a second number of antenna ports for the second CSI-RS.

5. The method of claim 4, further comprising receiving, from the UE, a rank indicator (RI) for the N antenna ports.

6. The method of claim 4, wherein the information on the plurality of CSI-RSs includes codebook information corresponding to the plurality of CSI-RSs.

7. A user equipment (UE) for transmitting channel state information (CSI), the UE comprising:
    a transceiver; and
    a controller, which is coupled to the transceiver, configured to control to:
        receive, from a base station, feedback configuration information including information on a plurality of channel state information reference signals (CSI-RSs) for channel measurement, receive, from the base station, a first CSI-RS and a second CSI-RS, generate a channel quality indicator (CQI) for N antenna ports based on the information on the plurality of CSI-RSs, wherein the N antenna ports are determined based on the information on the plurality of CSI-RSs, and transmit, to the base station, the CQI for the N antenna ports, and a number of the N antenna ports is a sum of a first number of antenna ports for the first CSI-RS and a second number of antenna ports for the second CSI-RS, and wherein N is a natural number.

8. The UE of claim 7, wherein the controller is further configured to generate a rank indicator (RI) for the N antenna ports, and transmit, to the base station, the RI for the N antenna ports.

9. The UE of claim 7, wherein the information on the plurality of CSI-RSs includes codebook information corresponding to the plurality of CSI-RSs.

10. A base station for receiving channel state information (CSI), the base station comprising:

a transceiver; and a controller, which is coupled to the transceiver, configured to control to:

transmit, to a user equipment (UE), feedback configuration information including information on a plurality of channel state information reference signals (CSI-RSs) for channel measurement, transmit, to the UE, a first CSI-RS and a second CSI-RS, and receive, from the UE, a channel quality indicator (CQI) for N antenna ports, the CQI being generated based on the information on the plurality of CSI-RSs, wherein N is a natural number, and wherein the N antenna ports are determined based on the information on the plurality of CSI-RSs, and a number of the N antenna ports is a sum of a first number of antenna ports for the first CSI-RS and a second number of antenna ports for the second CSI-RS.

11. The base station of claim 10, wherein the controller is further configured to receive, from the UE, a rank indicator (RI) for the N antenna ports.

12. The base station of claim 10, wherein the information on the plurality of CSI-RSs includes codebook information corresponding to the plurality of CSI-RSs.

* * * * *